Oct. 8, 1968  A. H. LINDQUIST  3,404,738
DEVICE FOR INDICATING THE PRESENCE OF WATER IN AND FOR
REMOVAL OF WATER FROM RUNNER HUBS OF
HYDRAULIC TURBINES OR PUMPS
Original Filed Dec. 22, 1965  3 Sheets-Sheet 1

INVENTOR
ARNE HERMAN LINDQUIST

BY  Hane and Nydick

ATTORNEY

Oct. 8, 1968    A. H. LINDQUIST    3,404,738
DEVICE FOR INDICATING THE PRESENCE OF WATER IN AND FOR
REMOVAL OF WATER FROM RUNNER HUBS OF
HYDRAULIC TURBINES OR PUMPS
Original Filed Dec. 22, 1965    3 Sheets-Sheet 2

INVENTOR
ARNE HERMAN LINDQUIST

BY Hame and Nydick

ATTORNEY

Oct. 8, 1968 A. H. LINDQUIST 3,404,738
DEVICE FOR INDICATING THE PRESENCE OF WATER IN AND FOR
REMOVAL OF WATER FROM RUNNER HUBS OF
HYDRAULIC TURBINES OR PUMPS
Original Filed Dec. 22, 1965 3 Sheets-Sheet 3

INVENTOR
ARNE HERMAN LINDQUIST

BY Hane and Nydick

ATTORNEY

United States Patent Office 3,404,738
Patented Oct. 8, 1968

3,404,738
DEVICE FOR INDICATING THE PRESENCE OF WATER IN AND FOR REMOVAL OF WATER FROM RUNNER HUBS OF HYDRAULIC TURBINES OR PUMPS
Arne Herman Lindquist, Trollhattan, Sweden, assignor to Nydqvist & Holm Aktiebolag, Trollhattan, Sweden, Continuation of application Ser. No. 515,571, Dec. 22, 1965. This application July 26, 1967, Ser. No. 656,299
Claims priority, application Sweden, Dec. 23, 1964, 15,653/64
6 Claims. (Cl. 170—160.23)

ABSTRACT OF THE DISCLOSURE

There is disclosed a device for removing water from an oil-filled runner hub of a hydraulic turbine or pump secured to one end of the main shaft of the turbine or pump. One end of a lengthwise displaceable drain pipe extends with clearance through an axial bore of the shaft into a discharge pipe disposed in alignment with the shaft bore and communicating with the oil filling the runner hub. The other end of the pipe protrudes from an upper part of the turbine or pump for connecting a suction pipe thereto to pump out oil and water accumulations in the runner hub and the discharge pipe. As accumulations of oil and water within the discharge pipe are not subjected to violent disturbances the oil and water will rapidly separate so that water can be pumped out without having to remove most of the oil also.

---

The present application is a continuation application based upon my prior application Ser. No. 515,571 filed December 22, 1965 and now abandoned.

The present invention relates to a device for indicating the presence of water and for removal of water from the oil-filled runner hub of a hydraulic turbine or pump with adjustable runner blades.

In turbines and pumps with angularly adjustable runner blades (e.g. Kaplan and diagonal turbines) the mechanism for adjusting the blades is enclosed in the hub together with the necessary bearings for the blade stems. The mechanism and the bearings work entirely immersed in oil so that all the spaces in the hub are kept filled with lubricating oil (governor oil). The oil in the runner hub is prevented from leaking by means of sealing rings mounted around each blade stem.

The sealing rings are comprised by two separate sets the inner of which is oil-tight and the outer of which is water-tight, so that water is prevented from leaking into the hub and mixing with the oil. Between the inner and the outer sealing rings, there is an annular chamber which by means of conduits communicates with the suction side of the runner, so that it is possible to hold the water pressure outside the oil sealing rings lower than the oil pressure inside the hub. If a defect on an oil sealing ring occurs oil will consequently under normal conditions leak out without water leaking into the hub.

In spite of said precautions it is nevertheless possible for the water to accumulate in the hub. Even if there is no leaking through the blade seals, the condensation of the moisture of air may cause accumulation of water and after a long time of operation results in such a large amount of water that it has to be removed. It is also possible that a defect on a water sealing ring will appear so that the water pressure outside the corresponding oil sealing ring under certain operating conditions rises to a higher figure tthan inside the hub with the result of water leaking into the hub.

It is for that reason necessary to check at certain time intervals if water is present in such a quantity that its removal is necessary. Such a check is made when the turbine is stopped and preferably when the turbine has been stopped for about an hour. The water which owing to its higher specific weight has been forced upwards and outwards towards the blade seals by the centrifugal force at the rotation will then have time to separate from the oil and sink to the bottom of the runner hub.

Up to now it has been a difficult and time-consuming procedure to remove the water from the runner hub. One has been obliged to empty the spiral case of the turbine and as a rule also the draft tube and to mount a suitable scaffold under the runner and open a drain for the accumulated water in the bottom of the hub.

The above mentioned problem has been solved by the device according to the present invention, which has the characteristics stated in the claims.

The invention will be described in connection with the enclosed drawings, where in vertical sections:

Figure 1:
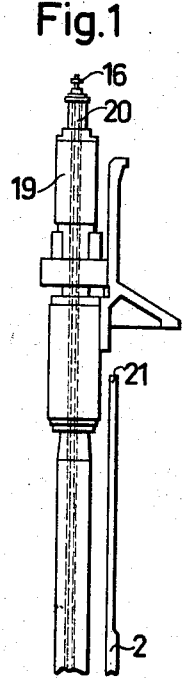
FIGURE 1 shows the upper end of the main shaft in a Kaplan turbine.
Figure 2:
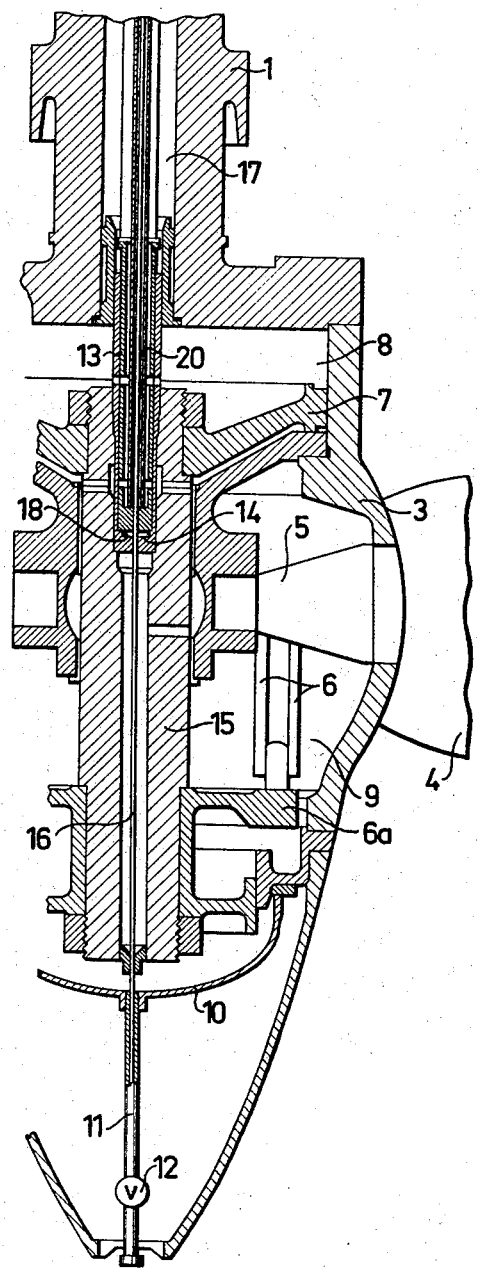
FIG. 2 shows the lower end of the main shaft in the same turbine with the runner hub.

The turbine according to FIGS. 1 and 2 comprises a turbine shaft 1, which at the top is connected to a generator shaft 2 and at the lower end is connected to a runner hub 3 in which runner blades 4 are carried. The blade stems 5 are by means of links 6 connected to a crosshead 6a which is rigidly connected to a servomotor piston 7 in a hydraulic cylinder 8. The oil chamber 9 of the hub is closed at the bottom by a wall 10 from which extends an oil discharge pipe 11 including a valve 12.

The piston 7 is controlled by a distributing valve 13 the casing 14 of which is rigidly attached to an operating rod 15. A central pipe 16 which extends from the pipe 11 spaced therefrom through a core hole 17 in the turbine and generator shafts and upwards to the top of the generator (not shown) is axially mounted in an axial ball bearing 18 in the casing 14. Since the casing 14 is rigidly connected with the piston 7 the central pipe 16 will move upwards and downwards during control motions. The pipe does not take part in the rotation of the turbine. The upper end of the central pipe extends through a power intensifier 19 for the control of the distributing valve 13 which intensifier is placed on the top of the generator.

In order to prevent cracking of the long, relatively weak central pipe 16 the same is limited to a slight bending by a heavier support pipe 20 surrounding the central pipe which is provided with support sleeves at some distance from each other. The support pipe takes part in the axial motion but not in the rotation of the turbine. The central pipe also and the support pipe consist of several parts which have been jointed at the mounting by means of pipe sockets.

The device works in the following manner. After removing any cover for the runner governor (not shown) on the top of the generator, the upper end of the central pipe 16 becomes easily accessible and the suction hose of a small hand pump is now connected to the pipe end. The first few liters pumped through the central pipe 16 probably are pure oil. The oil or perhaps water in the pipe 11 under the bottom wall 10 in the runner hub now raises in the pipe and after more pumping water or oil will be obtained. If there is water, the pumping is continued until the water is removed and the flow is pure oil.

In the core hole 17 of the turbine generator shafts there is always an oil column which communicates with the oil in the oil chamber 9 of the runner hub via suitable ducts (not shown) and extends upwards to the upper end 21 of the generator shaft. As a result, the suction height for the hand pump is only 1 to 2 meters. Said oil column in the core hole of the shaft presses oil upwards in the central pipe 16 as liquid is pumped out. If the central pipe 16 should be entirely filled with water the suction height will increase only in proportion to the specific weight of the water in relation to the specific weight of the oil.

The central pipe 16, in addition to being used for the removal of water, is used for transferring the angular position of the runner blades to an indicator on the top of the generator and for compensation of the volume changes in the oil chamber 9 that occur due to the control motions.

Figure 3:
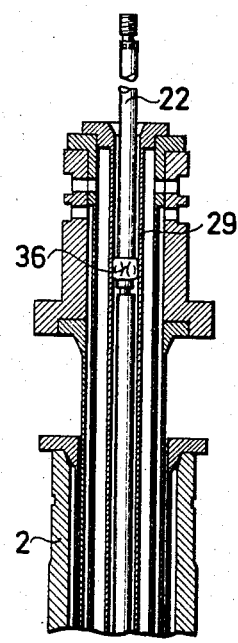
FIG. 3 shows the upper end of the main shaft in another Kaplan turbine.
Figure 4:
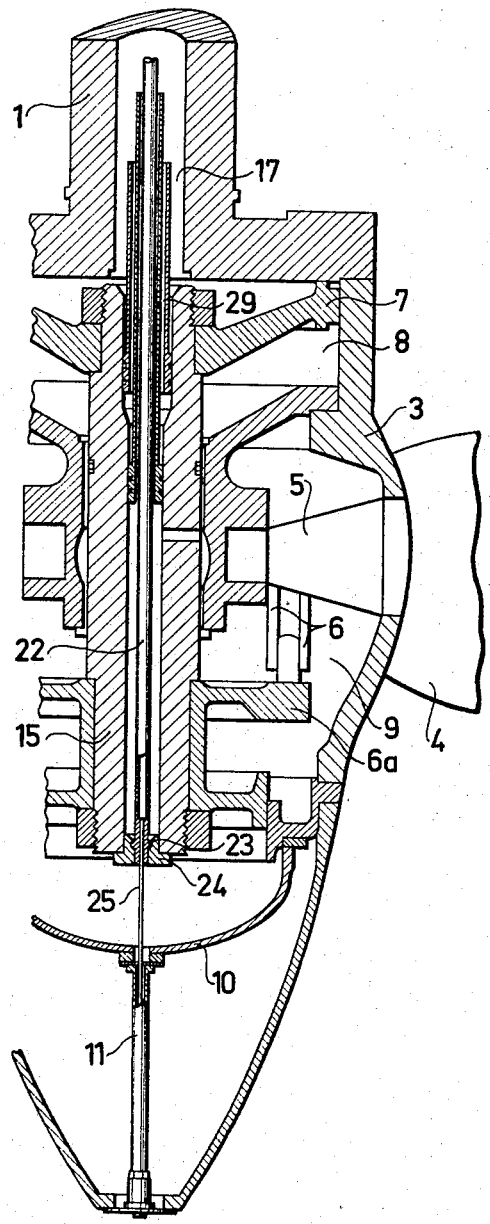
FIG. 4 shows the lower end of the main shaft in the latter turbine with the runner hub.
Figure 5:
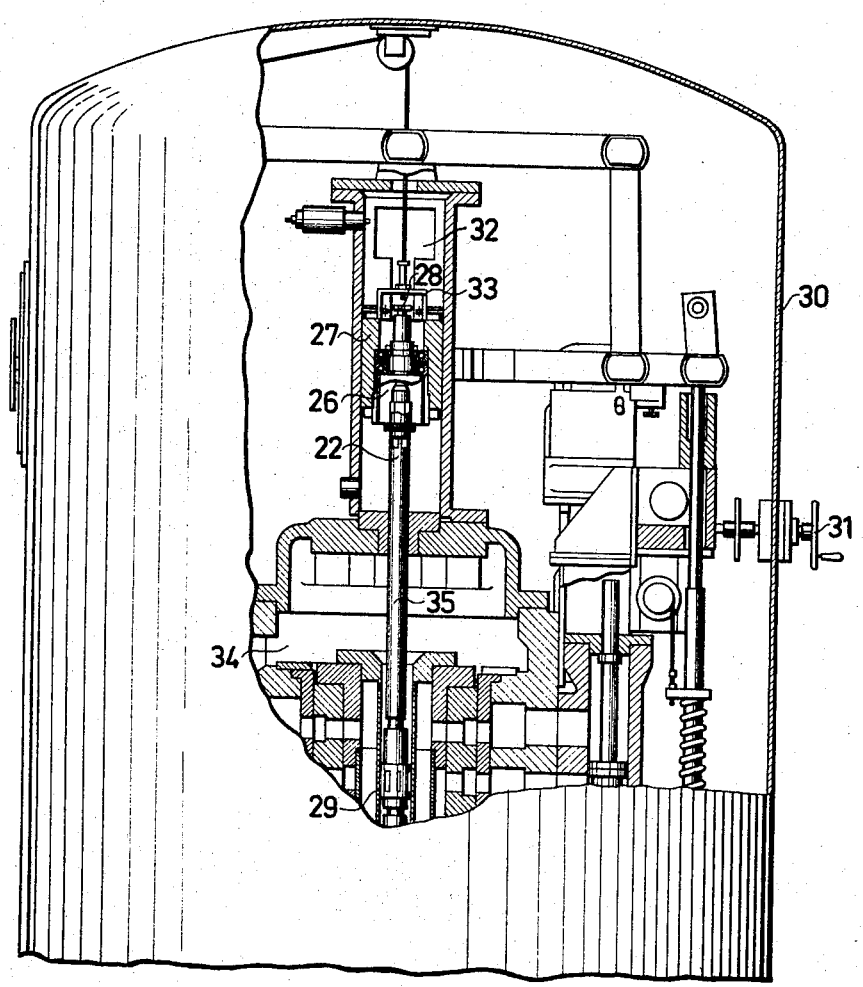
FIG. 5 shows the governor box of the turbine according to FIGS. 3–4.

The above described arrangement for removal of water from the runner hub is also applicable to turbines and pumps which have the distributor valve for the runner servomotor placed elsewhere. In FIGS. 3–5 a Kaplan turbine of that kind is shown, the details that are found in the already described embodiment, are given corresponding reference characters.

In the arrangement of FIGS. 3 to 5, the central pipe 22 is rigidly attached at its lower end to a sleeve 23 which bears on a bushing 24 fastened to the piston rod 15. During a control motion when the piston rod 15 moves upwards or downwards the central pipe 22 follows it. The central pipe also rotates with shaft 1 of the turbine.

An extension 25 of sleeve 23 which transfers the weight of the central pipe 22 to the bushing 24, extends through the bottom wall 10 of the oil chamber of the hub and down into the larger pipe 11 for discharge of the oil in the hub. The central pipe 22 passes through the turbine and generator shafts 1, 2 upwards to the top of the generator where the upper end of it is connected to a sleeve 26 attached to a crosshead 27 the function of which, among other functions is to indicate the angular position of the runner blades. The sleeve 26 has at its upper end a threaded portion for the connection of a suction hose for the removal of water. Normally the sleeve is closed by means of a plug 28.

In order to prevent cracking of the long, relatively weak central pipe 22 the same is supported by a surrounding support pipe 29 against which the central pipe bears with support sleeves 36 arranged at some distance from each other. The support pipe 29 rotates with the runner but takes, unlike the central pipe 22, no part in the axial motion. The pipes 22 and 29 consist of several parts which are joined when mounted. Space 17 and pipe 29 communicating therewith are connected to oil chamber 9 through suitable ducts (not shown).

The device operates in the following manner.

After the turbine has been stopped for some hours a door in a casing 30 housing the upper end of pipe 22 is opened and the plug 28 in the upper end of the central pipe 22 becomes accessible. The runner servomotor is by means of a hand wheel 31 driven to its uppermost position so that the plug 28 is moved into a space 32. Then a shackle 33 over the plug can be removed and the plug unscrewed. A connector attached to the suction hose of a small hand pump can now be screwed into the threaded portion of sleeve 26. Then the runner servomotor is driven to its lowest position.

From the central pipe 22 there is first pumped a quantity of liquid that probably is pure oil. Then there rises in the central pipe oil or water that may be in the pipe 11 under the bottom wall 10 in the oil chamber 9 of the runner hub, and after more pumping one checks if the liquid is oil or water. If there is water the pumping is continued until the pumped fluid is pure oil.

In the support pipe 29 which debouches with its upper end into a drain 34 for the distributor valve there always is an oil column that communicates with the oil in the runner hub. The static pressure in the runner hub corresponds consequently to the height of that oil column which reaches up to the level 36. The oil in the central pipe has the same level 35 when there is no control motion and the suction height for the hand pump becomes for that reason very small. The pressure from the oil column in the pipe 29 presses oil or water upwards in the central pipe 22 as liquid is pumped out.

What is claimed is:

1. A device for removing water accumulations from an oil-filled runner hub of a hydraulic turbine or pump having angularly adjustable runner blades, said device comprising in combination:
   a main shaft having a central axial bore extending along the length of the shaft;
   a runner hub including an oil chamber supported by said shaft on one end thereof for rotation in unison therewith;
   a plurality of runner blades adjustably supported on said hub;
   a discharge pipe disposed in the hub in axial alignment with said bore and communicating with said oil chamber to discharge oil and water accumulations therefrom; and
   a drain pipe mounted within said bore lengthwise displaceable therein, one end of said drain pipe extending from said one end of the shaft into said discharge pipe spaced from the inner wall thereof and the other pipe end protruding from said bore on the other end of the shaft and accessible at an upper part of the turbine or pump for connecting a suction pump to said other end of the drain pipe to pump out oil and water accumulations in the discharge pipe.

2. A device according to claim 1, wherein said discharge pipe is fitted in said bore with play to define an annular space between the bore wall and the outer pipe wall, said oil chamber communicating with said space to fill the same from said chamber to the level of the oil in the chamber, whereby the suction height for a pump connected to said other end of the drain pipe is correspondingly reduced.

3. A device according to claim 1, and comprising a support sleeve fitted in said axial bore and encompassing said drain pipe spaced apart therefrom to define an annular space between the drain pipe and the support sleeve, said annular space communicating with said oil chamber to fill the space with an oil column the level of which corresponds to the level of oil in the oil chamber, and spacers fitted in said annular space axially spaced apart from each other.

4. A device for removing water accumulations from an oil-filled runner hub of a hydraulic turbine or pump having angularly adjustable runner blades and for indicating the angular positions of said runner blades, said device comprising in combination:
   a main shaft having a central axial bore extending along the length of the shaft;
   a runner hub including an oil chamber supported by said shaft on one end thereof for rotation in unison therewith;
   a plurality of runner blades angularly adjustably supported on said hub;
   a discharge pipe disposed in the hub in axial alignment with said bore and communicating with said oil chamber at the bottom thereof for discharging oil and water accumulations therefrom;
   a drain pipe mounted within said bore, one end of said drain pipe extending from said one shaft end into said discharge pipe spaced apart from the inner wall thereof and the other pipe end being externally accessible at an upper part of the turbine or pump for connecting a suction pump to said upper end of the drain pipe to pump out oil and water accumulations in said discharge pipe, said drain pipe being lengthwise displaceable in reference to the shaft and rotatable in unison therewith;

servo-motor means for varying the angular positions of said runner blades;

first transmission means between the servo-motor means and the drain pipe for controlling the lengthwise position of the drain pipe in accordance with the angular positions of the runner blades as controlled by said servo-motor means;

indicating means accessible at an upper part of the hydraulic turbine or pump; and second transmission means transmitting the lengthwise position of the drain pipe to said indicating means for controlling the same by the position of the drain pipe.

5. A device according to claim 4 and comprising a distributor valve for controlling said servo-motor means, said valve being disposed in said runner hub and including a casing, said casing supporting said one end of the drain pipe.

6. A device according to claim 4 and comprising a distributor valve for controlling said servo-motor means, said distributor valve being disposed outside said runner hub, and said servo-motor means including a piston rod supporting said distributor valve lengthwise displaceable and rotatable in unison with said runner hub.

References Cited
UNITED STATES PATENTS

| | | | |
|---|---|---|---|
| 2,079,766 | 5/1937 | Jessop et al. | 253—148 X |
| 2,701,313 | 2/1955 | Obrist | 253—148 X |
| 3,229,771 | 1/1966 | Hedberg | 170—160.32 |

EVERETTE A. POWELL, JR., *Primary Examiner.*